(12) United States Patent
Lemchen (10) Patent No.: US 12,447,223 B2
(45) Date of Patent: Oct. 21, 2025

(54) SYSTEM AND METHOD FOR AUTOMATED STERILIZATION OF MEDICAL AND DENTAL INSTRUMENTS

(71) Applicant: Marc Lemchen, New York, NY (US)

(72) Inventor: Marc Lemchen, New York, NY (US)

(73) Assignee: Zeeno Robotics, LLC, Atlanta, GA (US)

(*) Notice: Subject to any disclaimer, the term of this patent is extended or adjusted under 35 U.S.C. 154(b) by 710 days.

(21) Appl. No.: 17/671,078

(22) Filed: Feb. 14, 2022

(65) Prior Publication Data

US 2022/0265882 A1 Aug. 25, 2022

Related U.S. Application Data

(60) Provisional application No. 63/151,155, filed on Feb. 19, 2021.

(51) Int. Cl.
*A61L 2/24* (2006.01)
*A61L 2/28* (2006.01)

(52) U.S. Cl.
CPC ........ *A61L 2/24* (2013.01); *A61L 2/28* (2013.01); *A61L 2202/17* (2013.01); *A61L 2202/24* (2013.01)

(58) Field of Classification Search
CPC ....................................................... A61L 2/24
See application file for complete search history.

(56) References Cited

U.S. PATENT DOCUMENTS

| | | | |
|---|---|---|---|
| 5,571,488 A * | 11/1996 | Beerstecher | A61L 2/24 134/94.1 |
| 8,567,880 B2 | 10/2013 | Treat | |
| 10,470,841 B2 | 11/2019 | St-Jean | |
| 10,716,870 B2 | 7/2020 | Rasmussen | |
| 2006/0109105 A1 | 5/2006 | Varner | |
| 2011/0005342 A1* | 1/2011 | Treat | G16H 40/40 414/754 |

(Continued)

FOREIGN PATENT DOCUMENTS

| | | |
|---|---|---|
| EP | 3391975 | 10/2018 |
| IT | 202000005662 A1 | 9/2021 |

(Continued)

*Primary Examiner* — Kevin Joyner
(74) *Attorney, Agent, or Firm* — MH2 Technology Law Group, LLP (57) ABSTRACT

An automated system and method for efficiently cleaning, organizing, and sterilizing medical instruments including but not limited to surgical, dental, and orthodontic instruments. The sterilization center includes at least one robotic arm or robotic element which is disposed over or near a workspace comprising a plurality of devices for cleaning, maintaining, and sterilizing instruments. The at least one robotic arm has the ability to move or traverse across the workspace and transfer each medical instrument as it completes each step in the sterilization process. The automated system is scalable and customizable, allowing it to be used in a variety of different office or hospital configurations. The system also includes an RFID reader which is configured to scan each instrument, allowing a user to track the sterilization process of any one particular instrument or be notified when any set of instruments has completed the sterilization process and is ready for use.

10 Claims, 3 Drawing Sheets

(56) References Cited

U.S. PATENT DOCUMENTS

| | | | |
|---|---|---|---|
| 2012/0107184 A1* | 5/2012 | Asiyanbola | A61L 2/24 |
| | | | 422/291 |
| 2015/0224650 A1 | 8/2015 | Xu et al. | |
| 2020/0205926 A1 | 7/2020 | Keibel | |
| 2021/0113729 A1* | 4/2021 | Price | A61B 90/98 |
| 2021/0236676 A1* | 8/2021 | Araujo Dalla Bona | |
| | | | B65B 55/025 |

FOREIGN PATENT DOCUMENTS

| WO | 2018087225 | 5/2018 |
|---|---|---|
| WO | 2020127883 | 6/2020 |

* cited by examiner

SYSTEM AND METHOD FOR AUTOMATED STERILIZATION OF MEDICAL AND DENTAL INSTRUMENTS

This application claims priority to, and the benefit of the earlier filing date of US provisional patent application entitled "System and Method for Automated Sterilization of Dental and Orthodontic Instruments", filed on Feb. 19, 2021, Ser. No. 63/151,155, pursuant to 35 USC 119, the contents of all of which are incorporated herein by reference.

BACKGROUND

Field of the Technology

The invention relates to the field of automated or robotic systems, specifically to automated sterilization of medical, dental, or orthodontic instruments or other related items.

Description of the Prior Art

Medical institutions such as hospitals, health clinics, doctors' offices, as well as dentist and orthodontist offices include a cleaning or sterilization center which is dedicated to cleaning and sterilizing the various medical or dental instruments used in their practice. After any procedure is performed on a patient, the medical instruments used must be thoroughly cleaned and then sanitized before they can be reused on another patient. What is specifically included within the sterilization center can vary according to the specific type of practice, however most commonly the sterilization center comprises a countertop, table, or work space comprising a number of different means for cleaning their instruments. These instrument cleaning means include but are not limited to ultrasonic cleaners, alcohol baths, washers, sinks, and/or autoclaves among others.

Previously, to use the sterilization center, a trained technician, nurse, or medical assistant must manually clean and organize each instrument individually by first removing any trash or debris from the trays containing the contaminated instruments and then pre-washing each instrument, either by manually wiping each instrument with alcohol or by placing the instrument in an alcohol bath or ultrasonic cleaner. In some instances, such as in dentist and orthodontist offices, after being pre-washed the technician must then orientate and place each instrument in a corresponding space within a cassette. The cassette is then placed in a washer specially designed for such a purpose. Next, after the cleaning cycle is complete, the technician must remove the cassettes from the washer and drop them into a sterilization bag which is then placed inside an autoclave or other machine or device which is capable of sterilization through application of high pressure and temperatures. After the autoclave has completed its sterilization cycle, the technician removes the bagged cassettes from the autoclave and then places them on a drying or cooling rack or beneath other drying/cooling means such as a fan.

As can be seen from the above, the process of cleaning and sterilizing is time consuming and laborious. In addition, it requires a trained technician whose time and skill can be used more effectively elsewhere to focus solely on the monotonous yet essential task of sterilizing instruments. The burden of cleaning and sterilization is further magnified when the instrument is too large or bulky to fit within a cassette, thereby requiring the technician to wash the instrument by hand and/or run a sterilization cycle with only that particular instrument disposed in the autoclave, both of which in turn further decreases the efficiency of the technician's ability to sterilize instruments. Additionally, the sterilization of medical instruments can also present an occupational hazard to the technician can accidentally puncture or cut their hands or fingers with medical instruments which may not be fully cleaned or sterilized. Because of the inherent risk associated with unsterilized instruments, the technician must further record or document the sterilization process for each instrument for legal liability purposes, thereby further increasing the time needed to properly clean a set of medical instruments.

What is needed therefore is an automated system and method which effectively and efficiently cleans, organizes, and sterilizes medical instruments with only minimal support and oversight from a technician or other human operator. The system and method should be able to perform each of the tasks previously performed by the technician and should also be able to be adaptable so as to clean larger or more bulky instruments in addition to more commonly used instruments. Additionally, the system and method should provide a means for a user to track and monitor any specific instrument or group of instruments as they progress through the cleaning and sterilization process and to further document its successful completion.

BRIEF SUMMARY

The current invention provides an automated system for cleaning or sterilizing at least one instrument. The system includes a plurality of cleaning or sterilization devices that are each configured to clean or sterilize instruments that are disposed within a work area and at least one robotic element disposed within the work area. The robotic element itself is configured to traverse a length within the work area, transport the instruments between at least two of the plurality of cleaning or sterilization devices, and then operate at least one of the cleaning or sterilization devices.

In one embodiment, the cleaning or sterilization devices that are disposed within a work area may include a handpiece oiler, an ultrasonic cleaner, an instrument washer, and an autoclave.

In another embodiment, the robotic element includes a RFID reader and where the at least one instrument also includes at least one RFID tag.

In a further embodiment, the system also includes a frame that is disposed over the work area. Here, the robotic element is coupled to the frame and is further configured to traverse a length of the frame that is suspended over the work area.

In yet another embodiment, the robotic element is connected to an external controller which includes means for tracking a status related to the cleaning or sterilization of the instruments. The external controller also has a means for notifying a user that the cleaning or sterilization of the instrument is complete.

In another embodiment, the robotic element is further configured to insert the instrument into an instrument cassette at a predetermined orientation.

In yet another embodiment, the robotic element includes a robotic arm or a series of arms, at least one wheeled robot, and/or at least one aerial robot.

In another embodiment, the robotic element is also configured to transport the at least one instrument between at least two of the cleaning or sterilization devices. The robotic element further includes means for gripping, lifting, and rotating the instrument in order to operate at least one of the cleaning or sterilization devices.

The invention also provides a method for cleaning or sterilizing at least one instrument. The method includes disposing the instrument in the proximity of a robotic element, identifying the instrument by the robotic element, and then inserting the instrument into a plurality of cleaning or sterilization devices in sequence, where each of the plurality of cleaning or sterilization devices are configured to clean or sterilize the at least one instrument. Next, the instrument is transferred between each of the cleaning or sterilization devices in sequence by the robotic element, specifically upon the termination of the cleaning or sterilization process provided by the prior cleaning or sterilization device. A status related to the cleaning or sterilization of the instrument is tracked as it progresses through each of the cleaning or sterilization devices in sequence and then a user is notified that the cleaning or sterilization of the instrument is complete.

In one embodiment, the method further includes actuating each of the plurality of cleaning or sterilization devices in sequence by the robotic element after the instrument has been inserted therein.

In another embodiment, identifying the instrument by the robotic element specifically includes scanning an RFID tag that is disposed on the instrument by an RFID scanner that is coupled to the robotic element.

In a further embodiment, inserting the instrument into each of the cleaning or sterilization devices in sequence by the robotic element specifically includes inserting the instrument into a pre-wash device, inserting the instrument into an instrument washer after removing the instrument from the pre-wash device, and then inserting the instrument into a sterilization device after removing it from the instrument washer. Here, inserting the instrument into a pre-wash device includes the robotic element inserting the instrument into an ultrasonic cleaner and/or an alcohol bath. Alternatively, inserting the instrument into the instrument washer after removing it from the pre-wash device includes the robotic element inserting the instrument into a cassette and then inserting the cassette into the instrument washer. Next, an RFID tag disposed on the instrument is scanned with an RFID reader that disposed on the robotic element. An RFID tag in turn disposed on the cassette is then scanned with the RFID reader so that the RFID tag disposed on the instrument is associated with the RFID tag disposed on the cassette. The instrument is then inserted into the cassette according to a set of instructions as indicated by the RFID tag disposed on the cassette.

In a related embodiment, the instrument being inserted into the sterilization device after removing it from the instrument washer specifically includes first inserting the instrument into a sterilization bag and then inserting the sterilization bag itself into the sterilization device by the robotic element.

In another embodiment, notifying the user that the cleaning or sterilization of the at least one instrument is complete also includes indicating to the user that the cleaned or sterilized instrument is available for use in a specific procedure according to a predetermined schedule.

In another embodiment, tracking the status related to the cleaning or sterilization of the instrument as it progresses through the plurality of cleaning or sterilization devices in sequence specifically includes logging a time, date, or a duration that the instrument was in each of the cleaning or sterilization devices in sequence.

In a further embodiment, inserting the instrument into each of the plurality of cleaning or sterilization devices in sequence by the robotic element specifically includes inserting the instrument into a predetermined one of the plurality of cleaning or sterilization devices according to the instrument as identified by the robotic element.

In another embodiment, transferring the instrument between each of the cleaning or sterilization devices in sequence upon termination of the cleaning or sterilization process provided by the prior cleaning or sterilization device specifically includes the robotic element traversing a work area which accommodates the cleaning or sterilization devices.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
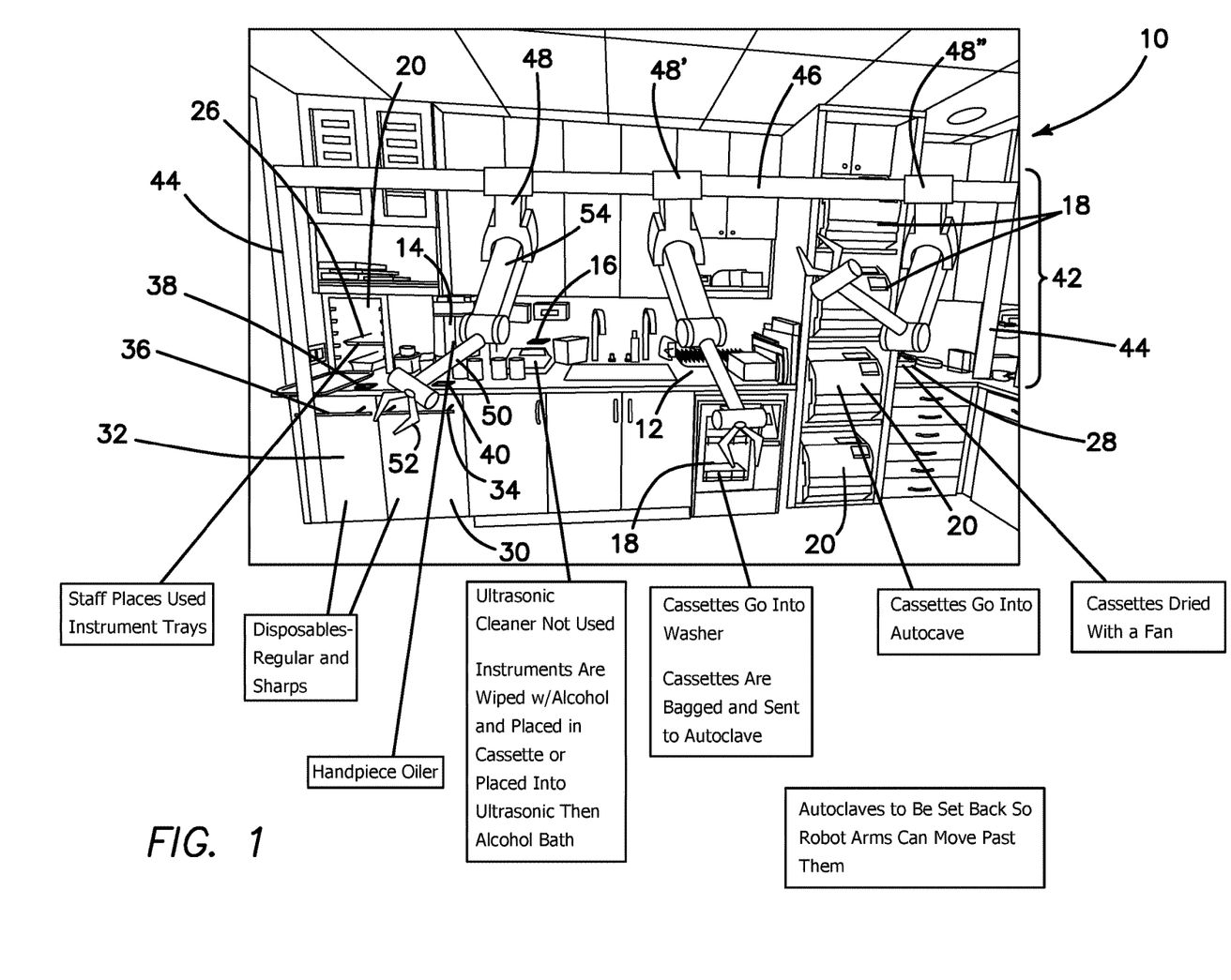
FIG. 1 is a front view of a first embodiment of the current invention comprising a plurality of robotic arms disposed on a frame which is in turn mounted or disposed above a pre-existing cleaning and sanitization center within a dental or medical office.

The current invention is an automated system and method for efficiently cleaning, organizing, and sterilizing medical instruments including but not limited to surgical, dental, and orthodontic instruments. Greater detail of the system may be had by turning to FIGS. 1 and 2 which show a frontal view and a top-down view of a sterilization center 10, respectively. The sterilization center 10 comprises a counter top or work top 12 on which is disposed a plurality of well-known devices for cleaning, maintaining, and sterilizing instruments including but not limited to a handpiece oiler 14, an ultrasonic cleaner 16, an instrument washer 18, and at least one autoclave 20 or other sterilization device. Also disposed on the work top 12 is a rack 22 which is capable of storing a plurality of trays 24 in a stacked configuration, each of the plurality of trays 24 containing one or more instruments 26. Disposed on an opposing end of the work top 12 is fan 28 which is used to dry off and cool down the instruments 26 once they have been removed from one of the autoclaves 20. As shown in FIG. 1, disposed beneath or under the work top 12 is a plurality of additional devices or containers, including but not limited to a first waste container 30 for general refuse and a separate, second waste container 32 for sharp items or hazardous materials. The first and second waste containers 30, 32 may be accessed by pulling their respective handles 34, 36 and then depositing the refuse, or alternatively, by dropping the refuse through a corresponding gap or hole 38, 40 defined in the upper surface of the work top 12.

Figure 2:
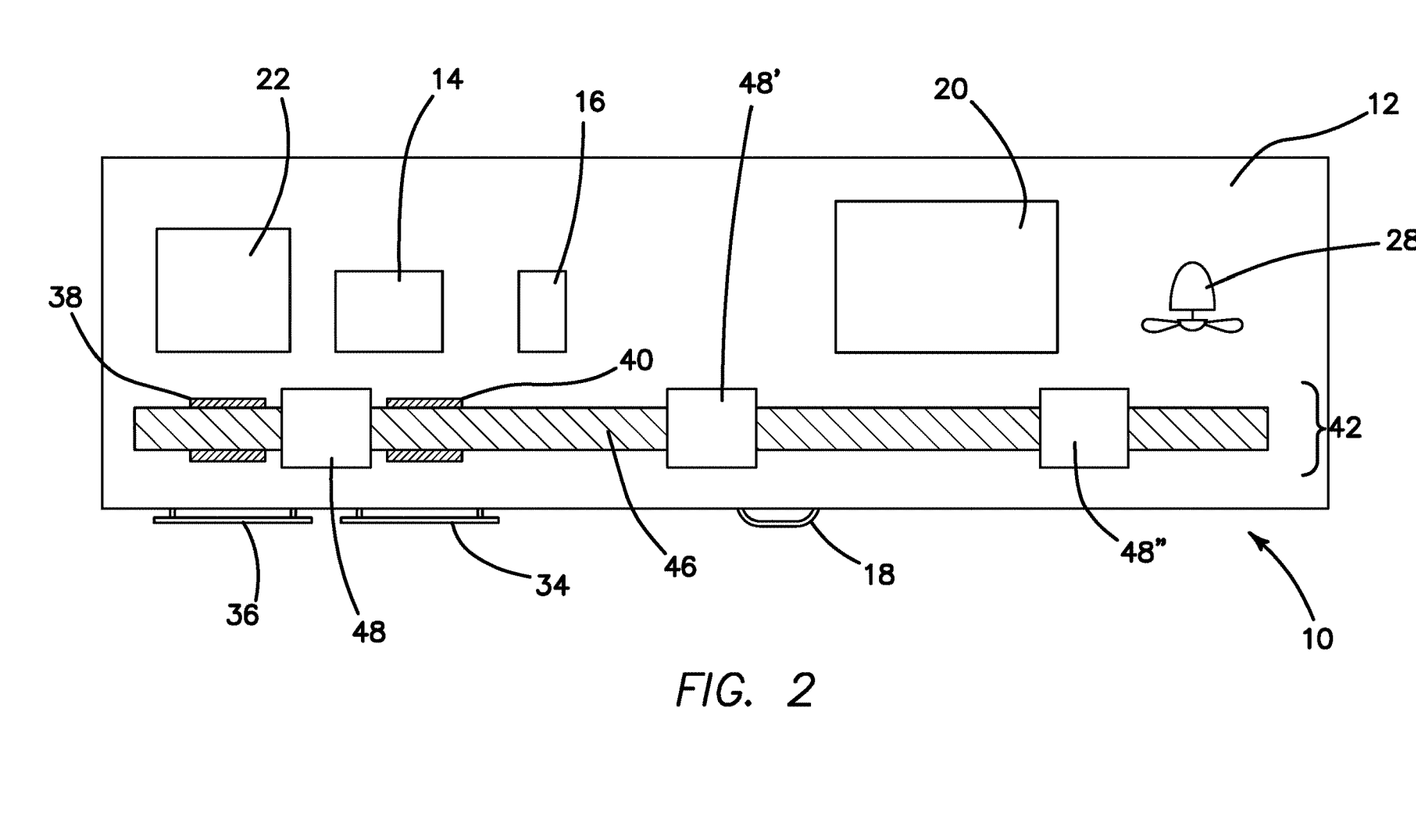
FIG. 2 is a top down view of the current invention seen in FIG. 1.

It should be noted that the type, number, and exact placement of the various cleaning and sterilization devices within the sterilization center 10 as seen in FIGS. 1 and 2 is meant to be illustrative purposes only and that the specific configuration of the sterilization center 10 may be specifically tailored for each health professional's specific type of practice or needs. For example, one health professional may require a sterilization center 10 with at least four autoclaves 20 disposed in a stacked configuration as seen in FIG. 1, however another health professional may only require two and may not have the space for a stacked configuration and so instead must dispose them side by side. In another example, one type of health professional may not need an ultrasonic cleaner 16 at all and instead may require another type of cleaning device which is not explicitly disclosed herein but which may be incorporated into the sterilization center 10 in its place. It is therefore to be expressly understood that different configurations of the sterilization center 10 other than what is explicitly shown are well within the spirit and scope of the current invention.

Returning to FIGS. 1 and 2, the sterilization center 10 further comprises a frame 42 coupled to or embedded in the work top 12. The frame 42 itself comprises a plurality of vertical posts 44 and at least one horizontal traverse or track 46. Disposed or coupled to the horizontal traverse 46 are a plurality of robotic arms or elements 48, 48', 48". Each robotic arm or element 48, 48', 48" preferably comprises an upper portion 54 and a lower portion 50 with a hand or other gripping tool 52 coupled to a distal end of the lower portion 50. Each robotic arm or element 48 is further configured to traverse the horizontal track 46 in either lateral direction, thereby allowing each robotic arm or element 48, 48', 48" to be suspended above the work top 12 while moving across or over at least a portion of the length of the work top 12. Additionally, each robotic arm or element 48, 48', 48" may pivot, bend, or rotate between each joint disposed on either end of the upper portion 54 and the lower portion 50 accordingly so that the upper portion 54 and the lower portion 50 may access or reach each portion of the work top 12. The gripping tool 52 may be actuated to open, close, grip, or otherwise grab and hold an object between its calipers, pincers, or robotic fingers.

As seen in FIGS. 1 and 2, the frame 42 comprises two vertical posts 44 and single horizontal traverse or track 46, however it is to be expressly understood that fewer or additional posts 44 or tracks 46 may be used in order to best suit the particular sterilization center 10 the current invention is installed or placed in. Similarly, while three robotic arms or elements 48, 48', 48" are seen in FIGS. 1 and 2, fewer or additional robotic arms or elements 48 may be disposed along the track 46 so as to provide the most efficient means possible for sterilizing the health professional's instruments 26.

The plurality of robotic arms or elements 48, 48', 48" are controlled and monitored by an external controller such as a computer, smart device, or other means which is communicated to the robotic arms or elements 48 through a wireless connection such as Bluetooth®. The external controller contains the instructions for each robotic arm or element 48, 48', 48" to clean, organize, and sterilize the instruments 26 and allows the health professional to begin or end the sterilization process when needed. Additionally, the external controller further comprises an input means for the health professional to edit, amend, or change the specific operational instructions or programming for one or all of the robotic arms or elements 48, 48', 48".

It should be noted that the robotic arms or elements 48, 48', 48" and its corresponding frame 42 are meant to be for illustrative purposes only and that fewer, additional, or different robotic elements may used in conjunction with or instead of said elements. For example, instead of the robotic arms 48, 48', 48", the robotic elements may instead be a plurality of wheeled or aerial robots as disclosed in U.S. Provisional Application 63/291,764 entitled "System and Method for Robotic Office Management" which is herein incorporated by reference in its entirety. Such a system or network of a plurality of robots comprising trays, means for actuation, and navigation means could be used to work in tandem to complete a series of tasks related to the cleaning and sanitizing of medical instruments that is controlled from a single control point or terminal.

Figure 3:
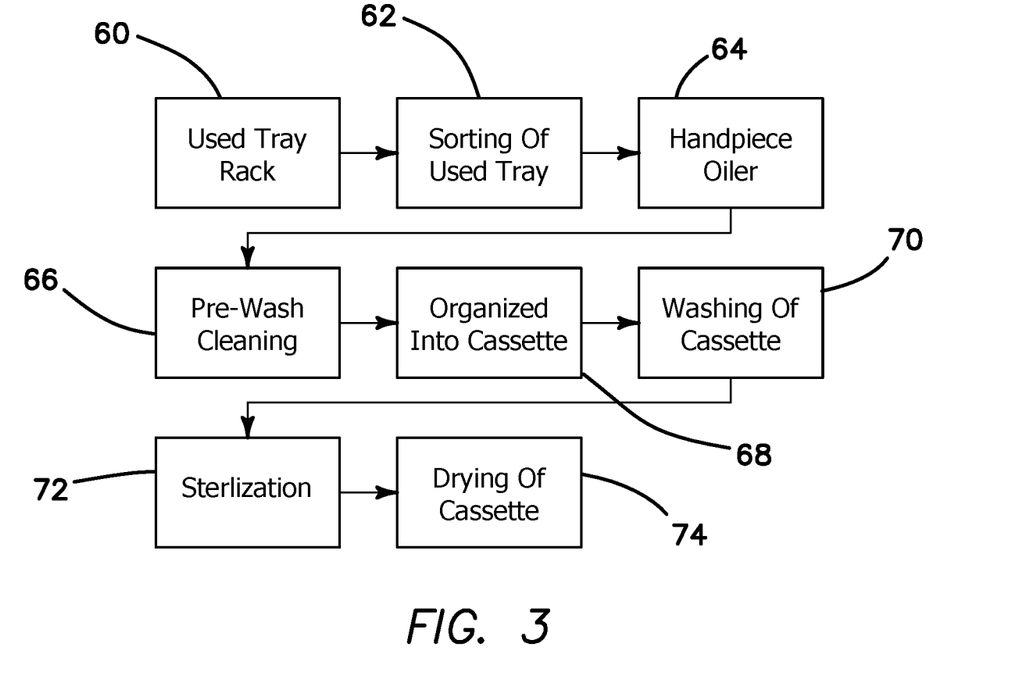
FIG. 3 is a flow diagram illustrating a method of use of the current invention when cleaning and sterilizing one or more dental or medical instruments.
Figure 4:
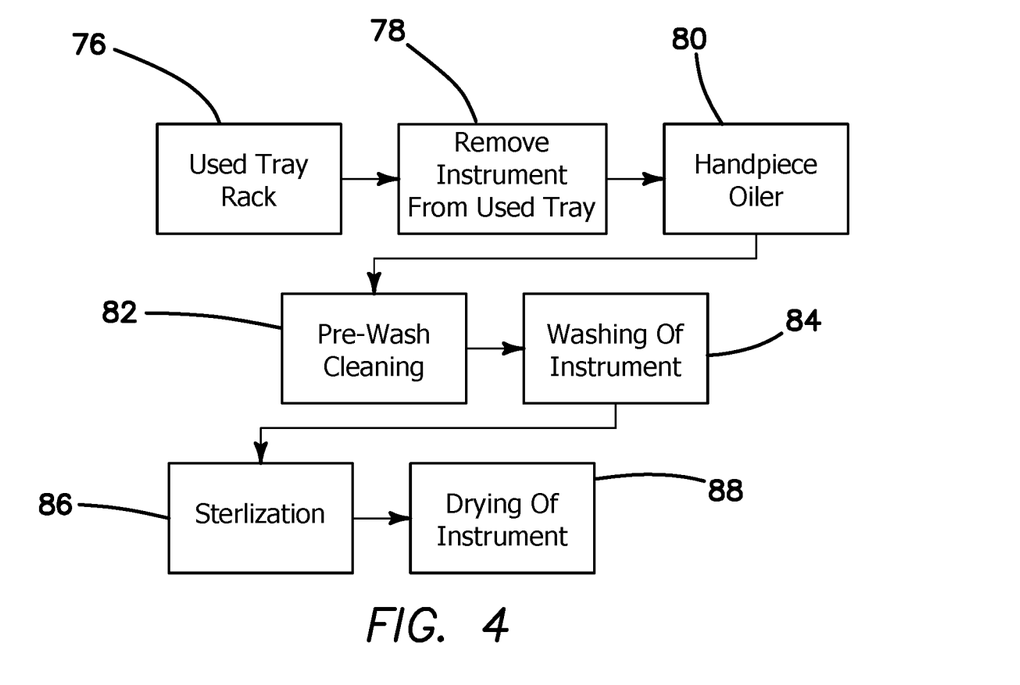
FIG. 4 is a flow diagram illustrating an alternative embodiment related to the use of the current invention when cleaning and sterilizing one or more specialized or large dental or medical instruments.

Further understanding of how the current invention operates may be seen from the flow diagrams presented in FIGS. 3 and 4. Starting with FIG. 3, the health professional or other means such as a mobile robot or automated machine begins the current sterilization method by first placing the used trays 24 containing one or more contaminated instruments 26 into the rack 22 in step 60. After initializing the sterilization process at the external controller, a first robotic arm or element 48 traverses across the track 46 until it is sufficiently disposed in front of the rack 22 where it then removes the tray 24 containing the contaminated instruments 26. Then, with either the assistance of a second robotic arm or element 48' or by placing the tray 24 onto the work top 12, the first robotic arm or element 48 sorts through the contents of the tray 24 in step 62. In this step, general refuse is picked up by the gripping tool 52 of the first robotic arm or element 48 and placed or dropped into the first waste container 30 while other hazardous materials such as used syringes and the like are picked up by the gripping tool 52 and then placed or dropped into the second waste container 32. After sorting the contents of the tray 24, the only items left in the tray are the contaminated instruments 26 which are to be cleaned and sterilized.

Next, in step 64, the robotic arm or element 48 which comprises an RFID reader, barcode scanner, or other recognition means such as image instrument recognition, scans or reads an RFID tag or barcode disposed on or within each of the instruments 26 in order to identify specific instruments, such as for example dental handpieces, which require lubrication. In one particular embodiment, a camera disposed on the robotic arm or element 48 may be used in conjunction with an AI image recognition program so as to recognize or identify a specific instrument 26 by its unique shape. The robotic arm or element 48 then removes those particular instruments 26 from the tray 24 and places them into the handpiece oiler 14. In one particular embodiment, the robotic arm or element 48 is programmed or trained to operate or set the handpiece oiler 14. Alternatively, the handpiece oiler 14 may be specifically designed or configured to operate in conjunction with the robotic arm or element 48 so that once the instruments 26 are inserted into the handpiece oiler 14, the handpiece oiler 14 automatically begins the lubrication process. Once the lubrication process has been completed, the robotic arm or element 48 removes the instruments 26 from the handpiece oiler 14 and returns them to the tray 24 or to another portion of the work top 12.

In step 66, the robotic arm performs a preliminary wash of the instruments 26. In one preferred embodiment, the robotic arm wipes each instrument 26 with alcohol thereby removing any relatively large debris disposed thereon. In a related embodiment, each instrument 26 is instead or additionally placed into an alcohol bath disposed on the work top 12. In yet another embodiment, instead of wiping each instrument 26 with alcohol, the robotic arm or element 48 may first place one or more of the instruments 26 into the ultrasonic cleaner 16 and then drop the instrument into an alcohol bath once the ultrasonic cleaning process has been completed.

Following step 66, the robotic arm 48 begins to organize the now pre-cleaned instruments 26 and prepare them for further washing and sterilization in step 68. The robotic arm or element 48, using the equipped RFID reader, barcode scanner, or other scanning means, reads each the RFID tag or barcode disposed on each instrument 26 and matches or associates each instrument with a predetermined cassette and/or a predetermined position within a cassette. Specifically, after initially scanning the RFID tag on a specific instrument 26, the resulting reading is matched against a database or set of instructions contained either within the robotic arm or element 48 or within the external controller which dictates not only which specific cassette the instrument 26 is to be placed in, but also which predetermined position and orientation within that cassette the instrument 26 is to be specifically inserted. The robotic arm or element 48 then scans or reads a corresponding RFID tag or barcode disposed on the cassette to ensure that it is the correct cassette. If the cassette does not match the corresponding ID for the cassette meant for the previously scanned instrument 26, the cassette is placed to the side or removed from the work top 12 and a new cassette is scanned to determine if it is the proper cassette for the currently selected instrument 26. If the cassette does match the corresponding ID for the cassette meant for the previously scanned instrument 26, the robotic arm 48 opens the cassette and then places the scanned instrument 26 into the cassette accordingly. A plurality of secondary RFID tags or barcodes may be distributed throughout the inside of each cassette so that after the robotic arm or element 48 has placed and/or secured the instrument 26 to an internal portion of the cassette, an adjacent secondary RFID tag or barcode is scanned to ensure that the instrument 26 has been placed at the correct predetermined location and orientation within that particular cassette. If there is a mismatch between the scanned secondary RFID tag or barcode and the specific ID contained within the external controller, the robotic arm or element 48 removes the instrument 26 and rescans the remaining RFID tags or barcodes within the cassette to determine where the correct position is. This automated organizing process is repeated until the prerequisite number or type of instruments 26 have been correctly inserted into the cassette. The specific number or type of instruments 26 which are to be placed within the cassette may be determined by a predetermined threshold amount, however in a preferred embodiment, each RFID tag or barcode corresponding to the cassette contains a list or predetermined set of instruments 26 that are for a specific related treatment or procedure. For example, one cassette may be dedicated to housing or accommodating instruments 26 related or needed for a dental cleaning, while another cassette may be dedicated to housing or accommodating instruments 26 related to orthodontic bracket removal.

Next in step 70, each cassette which is now full of pre-washed instruments 26, is closed and then placed by the robotic arm or element 48 into the instrument washer 18. In one embodiment, the first robotic arm or element 48 traverses across the length of the work top 12 via the suspended horizontal track 46 until it is disposed in front of the instrument washer 18 where the robotic arm or element 48 can then insert the cassette therein. Alternatively, after the organization and placement of the instruments in step 68 has been completed, the second robotic arm or element 48' may instead pick up the cassette using its corresponding gripping tool 52, traverse the length of the work top 12 via the suspended horizontal track, and then insert the cassette into the instrument washer 18, thereby leaving the first robotic arm or element 48 free to return to the rack 22 and repeat steps 60-68 with a new batch of instruments 26. In yet another embodiment, the first robotic arm or element 48 and the second robotic arm or element 48' may work in conjunction with one another in order to complete step 70. For example, after completing step 68, the first robotic arm or element 48 or the external controller signals or prompts the second robotic arm or element 48' which then moves over to the instrument washer 18 and opens it, allowing the first robotic arm or element 48 to approach and then insert the cassette therein. The instrument washer 18 is then initiated by either the first or second robotic arm or element 48, 48', or alternatively, the instrument washer 18 may be configured to automatically begin its washing cycle immediately after being closed by either of the robotic arms or elements 48, 48'.

Once the instrument washer 18 has completed its wash cycle, the second robotic arm or element 48' in step 72 as seen in FIG. 3 removes the cassette from the instrument washer 18 and then places it in a sterilization bag. The bagged cassette is then dropped or placed by the second robotic arm or element 48' into one of the plurality of autoclaves 20 which is then initiated and which performs a high-pressure sterilization of the bagged cassette. In a related embodiment, instead of the second robotic arm or element 48' removing each cassette from the instrument washer 18 and placing it into an autoclave 20, a third robotic arm or element 48" may be used to perform the same task which in turn allows the second robotic arm or element 48' to perform a different task or to return to the pre-wash portion of the work top 12 and place a new, different cassette into the instrument washer 18.

In step 74, after the autoclave 20 has completed its sterilization cycle, the second or third robotic arm or element 48', 48" removes the bagged cassette from the autoclave 20. Next, the bagged cassette is then placed into a dedicated drying area or rack where the fan 28 may finish the drying/cooling process of the instruments 26. Alternatively, any of the robotic arms or elements 48, 48', 48" may simply hold the bagged cassette after it has been removed from the autoclave 20 until it is sufficiently cool for a health professional or mobile robot to remove it from the sterilization center 10. After the drying process is complete, the third robotic arm or element 48" may place the bagged cassette into a storage area, however in preferred embodiment, the third robotic arm or element 48" picks up the now dried bagged cassette and places it into a rack or onto a cart where it may be stored until needed or until the health professional removes it from the sterilization center 10. In a further embodiment, the third robotic arm or element 48" may scan the RFID tag or barcode disposed on the cassette which notifies the external controller and/or the health professional that the scanned bagged cassette has completed the sterilization process and is now ready for immediate use. In a particular embodiment, the system tracks and monitors the number of cassettes and/or the number of instruments 26 which are available for immediate patient use. The system may further be integrated with a practice management program to ensure that the correct type and number of instruments 26 needed for any upcoming patient procedures are cleaned, sterilized, and otherwise made available before the scheduled procedure.

In a related embodiment depicted in FIG. 4, the current system and method may be used to directly clean and sterilize specialized instruments 26' which are too large or bulky to fit within a cassette, for example cheek retractors, bur blocks, and the like.

In this modified method, the health professional or mobile robot begins the process by first placing the used trays 24 containing one or more contaminated specialized instruments 26' into the rack 22 or another type of container such as a bin in step 76. After initializing the sterilization process at the external controller, a first robotic arm or element 48 traverses across the track 46 until it is sufficiently disposed in front of the rack 22 where it then removes the tray 24 containing the contaminated specialized instruments 26'. Then, with either the assistance of a second robotic arm or element 48' or by placing the tray 24 onto the work top 12, the first robotic arm or element 48 sorts through the contents of the tray 24 in step 78. In this step, general refuse is picked up by the gripping tool 52 of the first robotic arm or element 48 and placed or dropped into the first waste container 30 while other hazardous materials such as used syringes and the like are picked up by the gripping tool 52 and then placed or dropped into the second waste container 32. After sorting the contents of the tray 24, the only items left in the tray are the contaminated specialized instruments 26' to be cleaned and sterilized.

Next, in step 80, the robotic arm or element 48 which comprises an RFID reader, barcode scanner, or other recognition means, scans or reads an RFID tag or barcode disposed on each of the specialized instruments 26' in order to identify specific instruments such as dental handpieces which require lubrication. The robotic arm or element 48 then removes those particular specialized instruments 26' from the tray 24 and places them into the handpiece oiler 14. In one particular embodiment, the robotic arm or element 48 is programmed or trained to operate or set the handpiece oiler 14. Alternatively, the handpiece oiler 14 may be specifically designed or configured to operate in conjunction with the robotic arm or element 48 so that once the specialized instruments 26' are inserted into the handpiece oiler 14, the handpiece oiler 14 automatically begins the lubrication process. Once the lubrication process has been completed, the robotic arm or element 48 removes the specialized instruments 26' from the handpiece oiler 14 and returns them to the tray 24 or other portion of the work top 12.

In step 82, the robotic arm performs a preliminary wash of the specialized instruments 26'. In one preferred embodiment, the robotic arm or element 48 wipes each specialized instrument 26' with alcohol thereby removing any relatively large debris disposed thereon. In a related embodiment, each specialized instrument 26' is instead or additionally placed into an alcohol bath disposed on the work top 12. In yet another embodiment, instead of wiping each specialized instrument 26' with alcohol, the robotic arm or element 48 may first place one or more of the specialized instruments 26' into the ultrasonic cleaner 16 and then drop the instrument into an alcohol bath once the ultrasonic cleaning process has been completed.

Next in step 84, each specialized instrument 26' which is now fully pre-washed, is placed by the robotic arm or element 48 into the instrument washer 18. In one embodiment, the first robotic arm or element 48 traverses across the length of the work top 12 via the suspended horizontal track 46 until it is disposed in front of the instrument washer 18 where the robotic arm or element 48 can then insert the specialized instrument 26'. Alternatively, the second robotic arm or element 48' may instead pick up the specialized instrument 26' using its corresponding gripping tool 52, traverse the length of the work top 12 via the suspended horizontal track, and then insert the specialized instrument 26' into the instrument washer 18, thereby leaving the first robotic arm or element 48 free to return to the rack 22 and repeat steps 76-82 with a new specialized instrument 26'. In yet another embodiment, the first robotic arm 48 and the second robotic arm or element 48' may work in conjunction with one another in order to complete step 84. For example, after completing step 82, the first robotic arm or element 48 or the external controller signals or prompts the second robotic arm or element 48' which then moves over to the instrument washer 18 and opens it, allowing the first robotic arm or element 48 to approach and then insert the specialized instrument 26' therein. The instrument washer 18 is then initiated by either the first or second robotic arm or element 48, 48', or alternatively, the instrument washer 18 may be configured to automatically begin its washing cycle immediately after being closed by either of the robotic arms or elements 48, 48'.

Once the instrument washer 18 has completed its wash cycle, the second robotic arm or element 48' in step 86 as seen in FIG. 4 removes the specialized instrument 26' from the instrument washer 18 and then places it into a sterilization bag. The bagged specialized instrument 26' is then dropped or placed by the second robotic arm or element 48' into one of the plurality of autoclaves 20 which is then initiated and which performs a high-pressure sterilization of the bagged specialized instrument 26'. In a related embodiment, instead of the second robotic arm or element 48' removing each specialized instrument 26' from the instrument washer 18 and placing it into an autoclave 20, a third robotic arm or element 48" may be used to perform the same task which in turn allows the second robotic arm or element 48' to perform a different task or to return to the pre-wash portion of the work top 12 and place a new, different specialized instrument 26' into the instrument washer 18.

In step 88, after the autoclave 20 has completed its sterilization cycle, the second or third robotic arm or element 48', 48" removes the bagged specialized instrument 26' from the autoclave 20. Next, the bagged specialized instrument 26' is then placed into a dedicated drying area where the fan 28 may finish the drying process and further cool the bagged specialized instruments 26'. Alternatively, any of the robotic arms or elements 48, 48', 48" may simply hold the bagged specialized instrument 26' after it has been removed from the autoclave 20 until it is sufficiently cool for a health professional to remove it from the sterilization center 10. After the drying process is complete, the third robotic arm or element 48" may remove the bagged specialized instruments 26' and place them into a storage area, however in preferred embodiment, the third robotic arm or element 48" picks up the now dried and bagged specialized instrument 26' and places it into a rack or onto a cart where it may be stored until needed or until the health professional removes it from the sterilization center 10. In a further embodiment, the third robotic arm or element 48" may scan the RFID tag or barcode disposed on or in the bagged specialized instrument 26' which notifies the external controller and/or the health professional that the scanned specialized instrument 26' has completed the sterilization process and is now ready for immediate use.

In a further related embodiment, the above discussed system and methods of operation are customizable and are configured to incorporate additional or new cleaning or sterilization devices as they come to market or otherwise gain widespread use. For example, a combined ultrasonic cleaner and washer may be incorporated into the sterilization center 10 which would effectively combine steps 66 and 70, thereby simplifying the method and perhaps even negating the need for having a second or third robotic arm or element 48', 48" within the system. Similarly, if the standards of practice were to change, the current system and method could likewise be adapted or altered to fit the current standard of care. For example, if there were no longer any regulations requiring that instruments be bagged before being sterilized, a washer combined with an autoclave could be introduced into the current system and method which would wash rinse and autoclave all in one step. The robotic arms or elements 48, 48', 48" could likewise be adapted or reprogrammed to operate a single washer/autoclave device and therefore eliminate any steps for moving the cassettes and/or instruments back and forth therebetween or for bagging the cassettes and/or instruments.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. An automated system for cleaning or sterilizing at least one instrument, the system comprising:
   a plurality of cleaning or sterilization devices configured to clean or sterilize instruments disposed within a work area;
   a waste container disposed within the work area; and
   at least one robotic element disposed within the work area;
   where the at least one robotic element is configured to:
      traverse a length within the work area;
      sort any refuse from the at least one instrument using an RFID scanner, barcode reader, image recognition, or AI image processing;
      drop the refuse in the waste container;
      transport the at least one instrument between at least two of the plurality of cleaning or sterilization devices; and
      operate at least one of the plurality of cleaning or sterilization devices.

2. The system of claim 1 where the plurality of cleaning or sterilization devices disposed within a work area comprises:
   a handpiece oiler configured to oil the at least one instrument, wherein the handpiece oiler is coupled to the work top;
   an ultrasonic cleaner configured to clean the at least one instrument;
   an autoclave configured to sterilize the at least one instrument; and
   a fan configured to dry the at least one instrument.

3. The system of claim 1 where the at least one robotic element comprises a RFID reader and where the at least one instrument comprises at least one RFID tag.

4. The system of claim 1 further comprising a frame disposed over the work area, where the at least one robotic element is coupled to the frame and is configured to traverse a length of the frame that is suspended over the work area.

5. The system of claim 1 where the at least one robotic element is connected to an external controller configured to receive a signal from the at least one robotic element that is related to a status of the cleaning or sterilization of the least one instrument.

6. The system of claim 5 where the external controller is configured to receive a signal from the at least one robotic element that is related to notifying a user that the cleaning or sterilization of the least one instrument is complete.

7. The system of claim 1 where the at least one robotic element is configured to insert the at least one instrument into an instrument cassette at a predetermined orientation.

8. The system of claim 1 where the at least one robotic element comprises:
   a robotic arm;
   at least one wheeled robot; or
   at least one aerial robot.

9. The system of claim 1 where the at least one robotic element configured to transport the at least one instrument between at least two of the plurality of cleaning or sterilization devices and to operate at least one of the plurality of cleaning or sterilization devices further comprises a gripping tool configured for gripping, lifting, and rotating the at least one instrument.

10. The system of claim 1 where the at least one robotic element is configured to transport that at least one instrument to a further robotic element disposed within the work area.

\* \* \* \* \*